United States Patent
Shang

(10) Patent No.: US 7,333,266 B2
(45) Date of Patent: Feb. 19, 2008

(54) CWDM FILTER

(75) Inventor: Chang Chen E Shang, Taichung (TW)

(73) Assignee: Asia Optical Co., Inc, Taichung (TW)

( * ) Notice: Subject to any disclaimer, the term of this patent is extended or adjusted under 35 U.S.C. 154(b) by 107 days.

(21) Appl. No.: 11/106,704

(22) Filed: Apr. 15, 2005

(65) Prior Publication Data

US 2005/0280896 A1    Dec. 22, 2005

(30) Foreign Application Priority Data

Jun. 17, 2004    (TW) ................ 93117441 A

(51) Int. Cl.
  *G02B 1/10*    (2006.01)
  *G02B 5/28*    (2006.01)
  *G02F 1/03*    (2006.01)
  *G02F 1/07*    (2006.01)

(52) U.S. Cl. .............. 359/584; 359/260; 359/589

(58) Field of Classification Search ........ 359/260, 359/584, 586, 587, 588, 589, 590; 372/97; 398/68

See application file for complete search history.

(56) References Cited

U.S. PATENT DOCUMENTS

| | | | | |
|---|---|---|---|---|
| 5,615,289 A | * | 3/1997 | Duck et al. | 385/24 |
| 5,926,317 A | * | 7/1999 | Cushing | 359/588 |
| 6,011,652 A | * | 1/2000 | Cushing | 359/588 |
| 6,018,421 A | * | 1/2000 | Cushing | 359/589 |
| 6,404,521 B1 | | 6/2002 | Yang et al. | |

FOREIGN PATENT DOCUMENTS

| | | |
|---|---|---|
| CN | 982237448 B | 2/2000 |
| CN | 011390824 A | 6/2002 |

* cited by examiner

*Primary Examiner*—Alessandro Amari

(57) ABSTRACT

A CWDM filter of the present invention comprises a first portion and a second portion. The first portion includes at least two Fabry-Perot cavity structures, and the second portion comprises a non λ/4 multi-layer structure which has a plurality of alternately superposed high refraction index layers and low refraction index layers on the first portion thereof. The thicknesses of the non λ/4 layers are randomly produced as per a pre-set wavelength range which takes 1470 nm as the center wavelength thereof by computer.

12 Claims, 4 Drawing Sheets

CWDM FILTER

TECHNICAL FIELD

The present invention relates to an optical filter, especially to a CWDM filter which is applied in a coarse wavelength division multiplex (CWDM) system.

DESCRIPTION OF RELATED ARTS

Optical filters are components for selecting a desired wavelength range which have been playing an important role in optical fiber communication systems and optical detecting systems. Normally, optical filters have active type and passive type, among which the passive type optical filters are based on lens, diffraction grating and spectrum (frequency) filter, while the active type optical filter can be the combination of proper passive components and periodic detectors, wherein each periodic detector is tuned to a specific frequency.

There is an interference film optical filter among the passive ones. The interference film optical filters commonly are commonly composed of materials of high and/or low refraction indexes, whose thicknesses usually are preset to be a quarter of the wavelength of the incident light thereof. The materials are often deposited on a substrate made of glass or similar materials so as to achieve specific wavelength response characters as required. Normally, a medium film interference optical filter is consisted of stacks of high and low refraction index layers (films) which are alternately superposed over each other and whose thicknesses are normally multiples of a quarter of wavelength ($\lambda/4$) of the center wavelength of a desired wavelength range for the filter. The phases of the lights reflected within the high refraction index layers remain unchanged while the phases of the lights reflected within the low refraction index layers deflect 180°.

Due to the differences of the traveling distances (multiples of $2*\lambda/4$) between different lights, lights reflected in turn will become superposed together as they proceed ahead thereby producing a light beam having a high intensity within a narrow wavelength range, while the amount of other reflected output lights, which are outside of the narrow wavelength range, will have a sharp decrease. Hence, such kind of filters is commonly used to make high pass optical filters, low pass optical filters or high reflective film components. Furthermore, as the optic characters thereof depend on the reflection and transmission characters of the optical films thereof, such films are usually adopted to manufacture band-pass filters, low-pass filters, high-pass filters or band-reject filters.

Chinese utility patent CN982237448B provides a four quarter-wavelength narrow band optical filter with a 4.65 micron center wavelength. This filter is made by vacuum coating method and has $Al_2O_3$ as the material of the substrate thereof and ZnSe and TePb as the materials of the layers thereof. The film stack system thereof is designed to adopt structures of alternately superposed multi half wavelength layers with the cut-off area thereof TMAX<0.3%. Such design can be applied in the CO gas microanalysis fields of chemical industry, environment protection, iron and steel industry and medicine industry.

Advanced coating technology can be used to make extremely narrow band optical filters out of multi-layer medium film interference filters, thereby producing dense wavelength division multiplexers (DWDM) with the multiplexing channel spaces thereof less than 1 nm.

A Chinese patent application CN011390824A publishes an extremely narrow band film filter. The filter includes bottom layers vacuum vaporized in turn on a glass optical substrate, middle layers and top layers. The bottom layers are the combination of stochastic low refraction index layers alternately stacked over stochastic high refraction index layers. The middle layers and the top layers are respectively composed of stochastic layers with high refraction index and stochastic layers with medium refraction index which are alternately superposed over the stochastic layers with high refraction index thereof. The stochastic layers thereof are produced by proper randomly deposition method.

U.S. Pat. No. 6,404,521B1 discloses an optical filter system for adjusting the light propagating feature of a DWDM system, which uses an optic fiber cascade tree structure with N+1 stairs thereof. When it is combined with a multi-layer filter, it can also achieve the function of optic isolation, wherein the multi-layer filter may adopt Fabry-Perot Etalon (FPE).

As far as a MAN (Metropolitan area network) is concerned, no high requirements are imposed upon the transmission attenuation of simplex optic fibers, neither does it require an optic fiber amplifier. Hence, a relatively wide window of 1200-1700 nm can be used, and even the space between adjacent wavelength channels can be increased to be 10 or 20 nm, a WDM system having tens of channels can also be achieved, i.e., a coarse wavelength division multiplex (CWDM) system. The space between different wavelength channels propagating in a same optic fiber is the major parameter for differentiating DWDM and CWDM. The space between adjacent wavelength channels of a DWDM system is usually 200 GHz (0.8 nm) or 50 GHz (0.4 nm), and it may become narrower in a future system. However, the CWDM technology makes full use of the feature of short transmission distance of MAN, so that it is not limited by the amplifying wavelength range of EDFA (Erbium doped fiber amplifier). Instead, it can perform wavelength division multiplexing function at a wavelength space much wider than that of a DWDM system in the whole optic fiber propagation window of 1310-1560 nm.

In the aspects of multiplexer and de-multiplexer, the cost differences between a DWDM system and a CWDM system mainly lie in the fact that a CWDM filter contains less layers which makes it cheaper than a DWDM filter. A 0.8 nm optic filter of a DWDM system usually has about 300 layers, while a 20 nm optic filter of a CWDM system only need about 150 layers, which results in that the cost of a CWDM filter is about 50% less than that of a DWDM filter. In a CWDM system, as the space between adjacent channels can be broadened to be 20 nm, cheap multiplexers and de-multiplexers can thus be employed therein, thereby decreasing the cost of the CWDM system.

Nowadays, the widely applied WDM with 0.8 nm wavelength space in a DWDM system commonly adopt multilayer interference optic filters. An ideal interference filter for it is an interference band pass filter with $\lambda/4$ multi-layers with different thicknesses thereof. It is to insert a coupling layer between two high reflectivity multi-layer cavity structures. The superposition area between the two high reflectivity multi-layer cavity structures has an extremely low reflection value, and the function of the coupling layer is to remove the extremely low reflection value, i.e., to broaden the reflection zone thereof. The high reflectivity multi-layer cavity structures each are consisted of 2n+1 layers of alternately stacked high refraction index films (layers) and low refraction index films (layers), whose thicknesses are multiples of $\lambda/4$ (center wavelength thereof).

Commonly, CWDM filters adopt stacks of plurality of multi-layer cavities with the same structure, whose layer thickness is multiples of a quarter of the center wavelength thereof. However, in its 1260-1640 nm wavelength range, phenomena of light leakage or noises will occur in wavelength ranges other than that of the signals of the filter.

SUMMARY OF THE INVENTION

A main object of the present invention is to provide a CWDM filter which is applied in a coarse wavelength division multiplex (CWDM) system.

In order to achieve the objects as set forth, a CWDM optical filter is provided to include a first portion and a second portion. Among which, the first portion has at least two Fabry-Perot cavity structures, and the second portion comprises a non $\lambda/4$ multi-layer structure which is composed of plurality of alternately superposed high refraction index layers and low refraction index layers.

The thicknesses of the non $\lambda/4$ layers are randomly produced as per a pre-set wavelength range which takes 1470 nm as the center wavelength thereof by computer.

At least two Fabry-Perot cavity structures of the first portion shall obey the following rule: $(LH)^3 6L(HL)^3 H (LH)^2 2L(HL)^3 H(LH)^4 6L(HL)^4 H(LH)^3 4L(HL)^3 H(LH)^4 6L (HL)^4 H(LH)^3 4L(HL)^3 H(LH)^4 6L(HL)^4 H(LH)^3 2L(HL)^3 H (LH)^3 6L(HL)^2 H/N_S$. Wherein, $N_S$ represents for the substrate thereof, L represents for low refraction index layer with a thickness of $\lambda/4$, H represents for high refraction index layer with a thickness of $\lambda/4$, and $\lambda_O$ represents for the center wavelength thereof.

The center wavelength $\lambda_O$ of the present invention can be 1470 nm or 1490 nm, the maximal light transmittance index thereof is higher than 90%, and the cut-off wavelengths thereof are 1230-1457 nm (short wavelength), 1483-1830 nm (long wavelength).

The surface polishing diameter of the substrate thereof is 90 mm, and the substrate' thickness is 10 mm. The substrate can contain thereof such materials or elements as $SiO_2$, Barium, Lithium and Natrium.

Two adjacent Fabry-Perot resonance cavity structures of the first portion are connected to each other via a coupling layer. Each Fabry-Perot resonance cavity structure is composed of two multi-layer stacks of odd or even layers. The spacer layer of each Fabry-Perot resonance cavity is low refraction index and has a thickness of even-number multiples of $\lambda/4$ thereof.

As mentioned above, CWDM optic filters often adopt $\lambda/4$ stacks of a plurality of multi-layer cavities with the same structure, and in the 1260-1640 nm wavelength range, phenomena of light leakage or noises exist in wavelength ranges other than that of the signals of the filter. However, the CWDM optical filter in accordance with the present invention further has a plurality of non $\lambda/4$ multi-layer stacks with different structures (the second portion) on the basis of the first portion, which is consisted of a few $\lambda/4$ Fabry-Perot cavity structures with the same structure thereof. Thus, the afore-mentioned light leakage or noises phenomena can avoided, thereby achieving wider applications within the required wavelength ranges of optical communication field.

Other objects, advantages and novel features of the invention will become more apparent from the following detailed description when taken in conjunction with the accompanying drawings.

DETAILED DESCRIPTION OF PREFERRED EMBODIMENT

Details will be given with the combination of the figures thereof to the CWDM (coarse wavelength division multiplex) filter in accordance with the present invention as follows.

Figure 1:
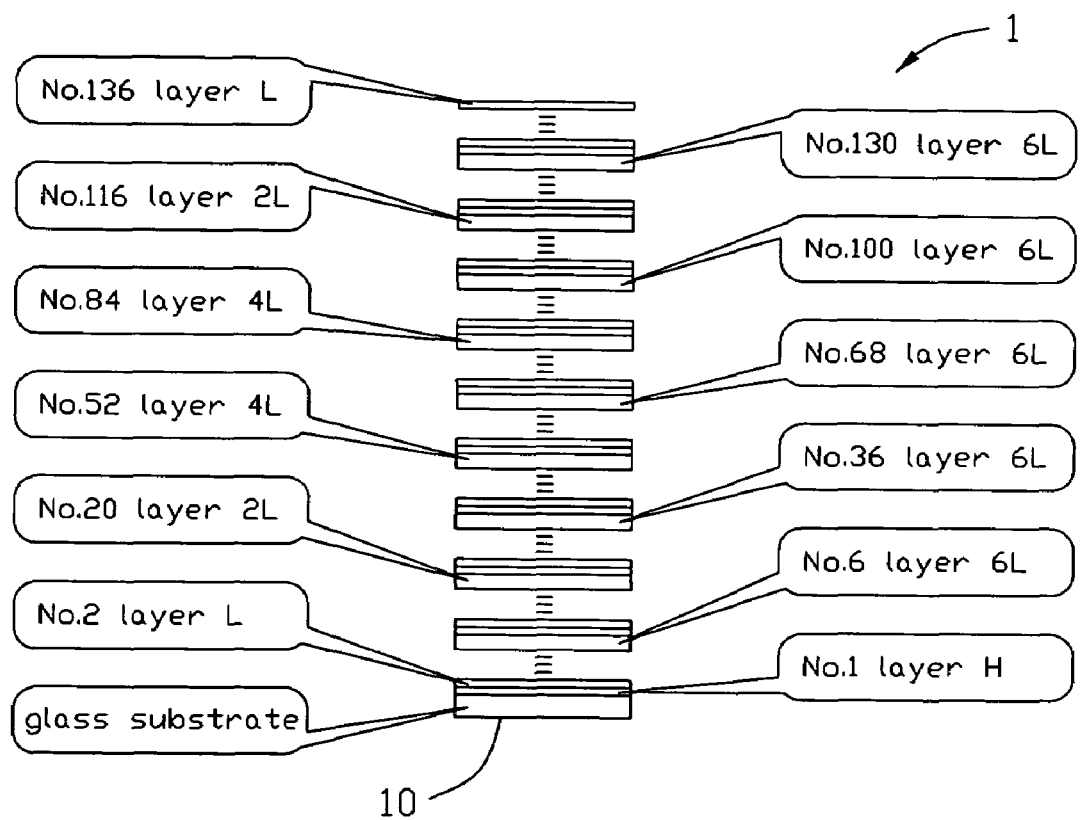
FIG. 1 is a sketch view of the multi-layer structure of the first portion of the CWDM filter in accordance with the present invention.
Figure 2:
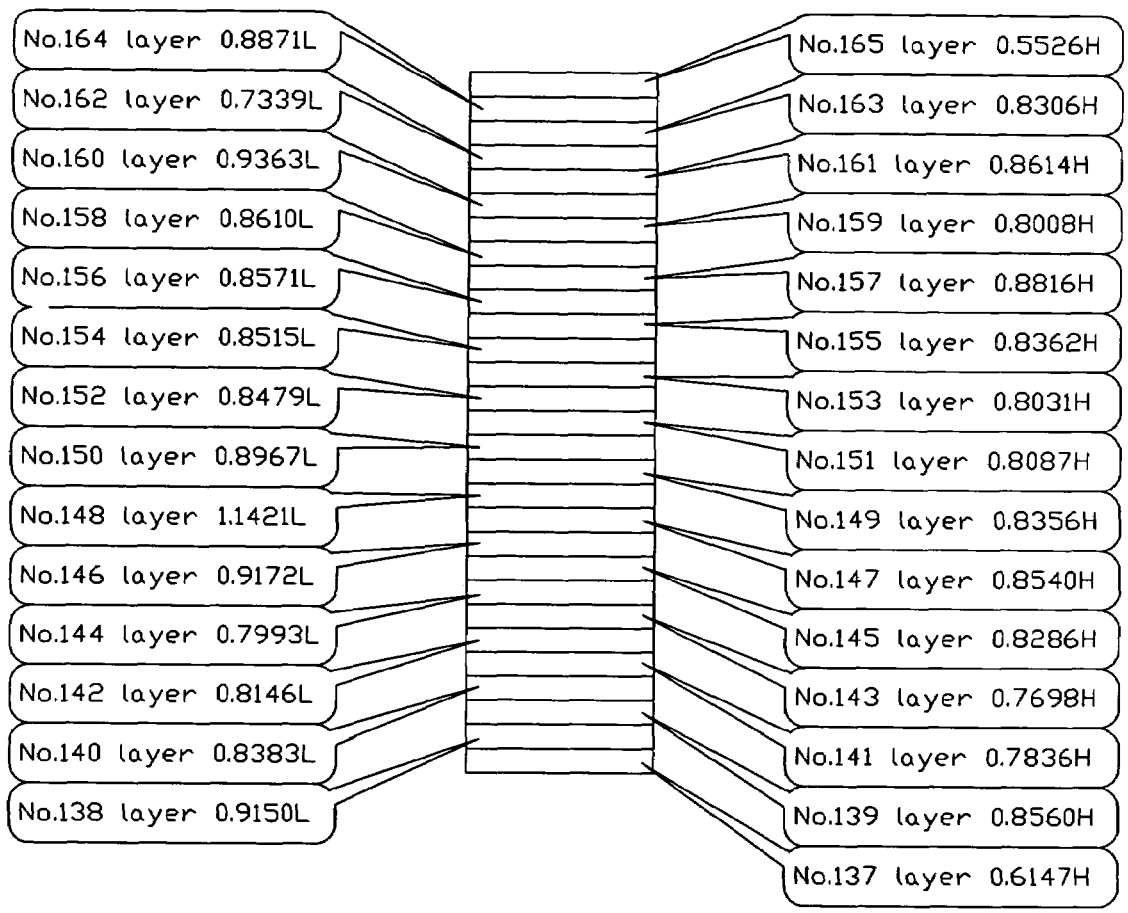
FIG. 2 is a sketch view of the multi-layer structure of the second portion of the CWDM filter in accordance with the present invention.
Figure 3:
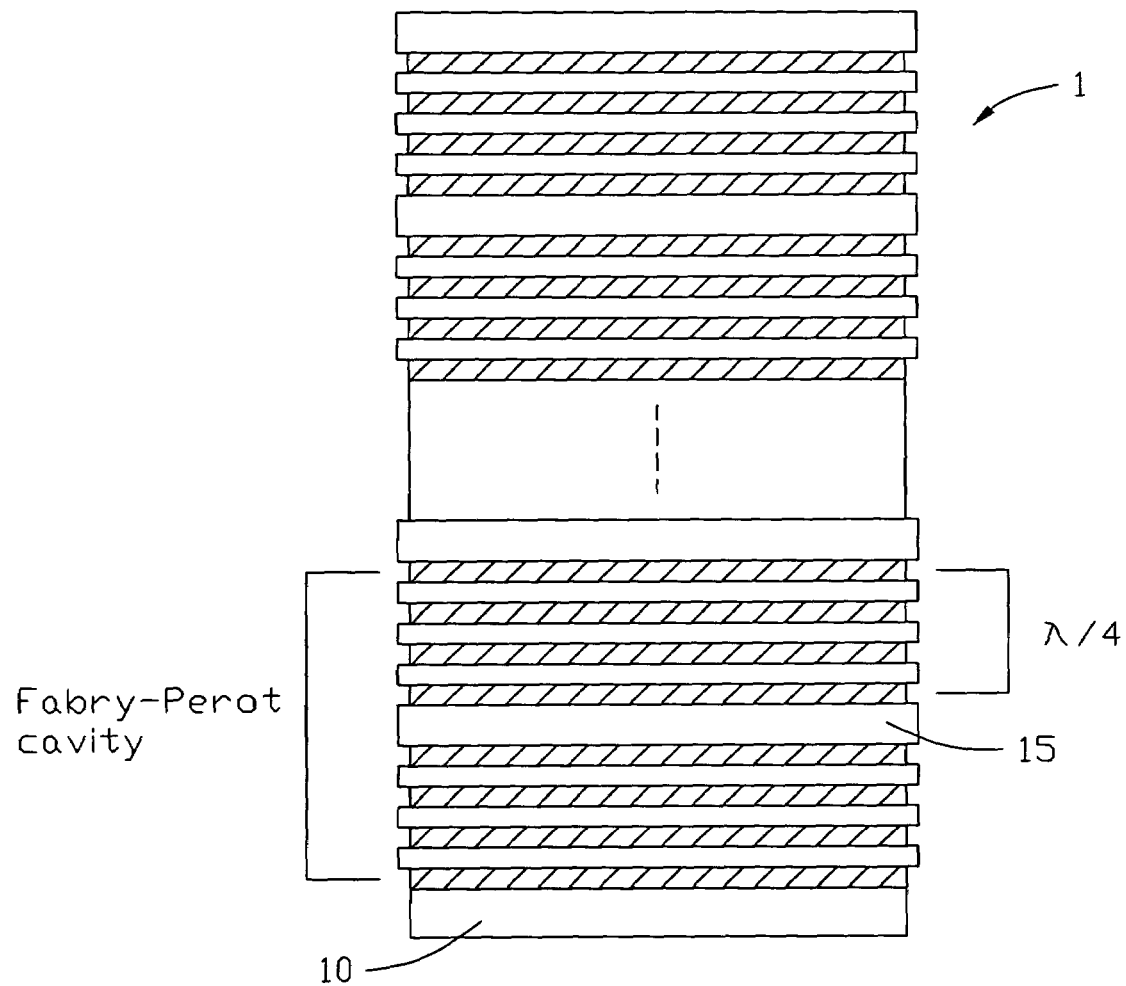
FIG. 3 is a sketch view of the whole layer structure of the CWDM filter in accordance with the present invention.

Referring to FIGS. 1, 2 and 3, a CWDM filter 1 in accordance with the present invention includes a first portion and a second portion. Among which, the first portion comprises at least two Fabry-Perot cavity structures and the second portion has a non $\lambda/4$ multi-layer structure which is composed of a plurality of alternately superposed high and low refraction index layers.

The amount of the alternately superposed high and low refraction index layers can be 28, 40, 50 or 60, and so on, which may be decided according to detailed requirements thereof and the application environment. In the case of the present invention, 40 layers may be taken as a better choice.

At least two Fabry-Perot cavity structures of the first portion shall obey the following rule: $(LH)^3 6L(HL)^3 H (LH)^2 2L(HL)^3 H(LH)^4 6L(HL)^4 H(LH)^3 4L(HL)^3 H(LH)^4 6L (HL)^4 H(LH)^3 4L(HL)^3 H(LH)^4 6L(HL^4 H(LH)^3 2L(HL)^3 H (LH)^3 6L(HL)^2 H/N_S$. Wherein, $N_S$ represents for the substrate thereof, L represents for low refraction index layer with a thickness of $\lambda/4$, H represents for high refraction index layer with a thickness of $\lambda/4$, and $\lambda_O$ represents for the center wavelength thereof.

The eight channels of 1470 nm, 1490 nm, 1510 nm, 1530 nm, 1550 nm, 1570 nm, 1590 nm and 1610 nm are most popularly applied in optical communication. The present invention mainly aims at the 1470 nm channel, other embodiments for the other seven channels can be realized according to the similar design theory thereof. For example, the center wavelength being set to be 1490 nm can also be suitable for the present invention. Therefore, the center wavelength $\lambda_O$ of the present invention may be 1470 or 1490 nm.

The maximal light transmittance index of the CWDM filter 1 of the present invention is higher than 90%, and the cut-off wavelengths thereof are 1230-1457 nm (short wavelength), 1483-1830 nm (long wavelength).

The surface polishing diameter of the substrate 10 thereof is 90 mm, and the thickness thereof is 10 mm. The substrate 10 can contain such materials or elements as $SiO_2$, Barium, Lithium and Natrium therein. The low refraction index layers can adopt $SiO_2$ layers, and the high refraction index layers can be oxidation layers. The materials for $\lambda/4$ layers (including low and high refraction index layers, i.e.) and the substrate 10 of the CWDM filter 1 may be decided as per detailed requirements or conditions thereof.

Two adjacent Fabry-Perot cavity structures of the first portion are connected to each other via a coupling layer. Each Fabry-Perot cavity structure is composed of two multi-layer stacks of odd or even-numbered layers. The spacer layer 15 of each Fabry-Perot cavity is of low refraction index and has a thickness of even-number multiples of λ/4 thereof.

Referring to FIG. 1, after a high refraction index layer with a thickness of λ/4 is stacked on the substrate 10 of the CWDM optical filter 1 of the present invention, a low refraction index layer with a thickness of λ/4 is stacked on (i.e., superposed over) the high reflective layer. And then, another high and low refraction index layers with thicknesses of multiples of λ/4 are continued to be alternately stacked on each other in turn until it comes to No. 136 layer thereof. Among which, the No. 6 layer has sub-layers with the λ/4 thickness stacked over each other for 6 times, that is, the thickness of the No. 6 layer is 6 multiples of λ/4. Similarly, the No. 20 layer has sub-layers with the λ/4 thickness stacked over each other for 2 times, the No. 36 layer has sub-layers with the λ/4 thickness stacked over each other for 6 times, the No. 52 layer has sub-layers with the λ/4 thickness stacked over each other for 4 times, the No. 68 layer has sub-layers with the λ/4 thickness stacked over each other for 6 times, the No. 84 layer has sub-layers with the λ/4 thickness stacked over each other for 4 times, the No. 100 layer has sub-layers with the λ/4 thickness stacked over each other for 6 times, the No. 116 layer has sub-layers with the λ/4 thickness stacked over each other for 2 times, the No. 130 layer has sub-layers with the λ/4 thickness stacked over each other for 6 times.

Figure 4:
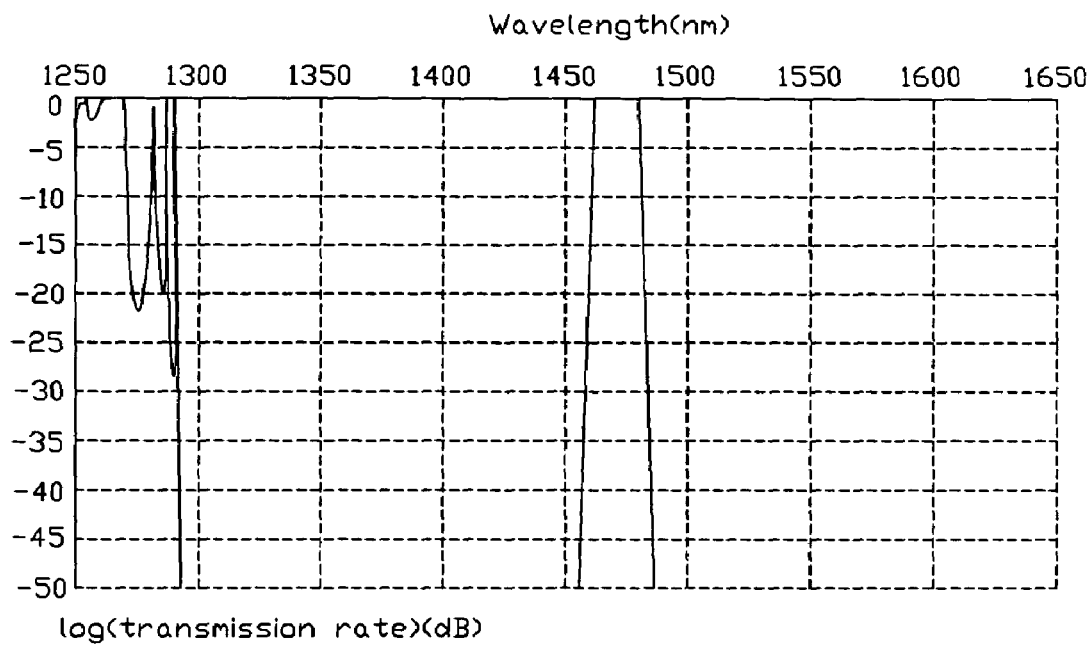
FIG. 4 is the spectrum characteristics graph of the first portion of the CWDM filter in accordance with the present invention.

The above is the general idea for the first phase design of the optical filter 1 in accordance with the present invention, which uses high and low refraction index layers with thicknesses of λ/4 stacked over each other alternately. The spectrum characteristics please refer to FIG. 4, from which we may see that noises exist within the 1260-1288 nm wavelength range. In order to eliminate these noises, a second phase design of layer stack in accordance with the present invention shall be added accordingly.

The second phase design is to stack layers with thicknesses of non whole number multiples of λ/4 onto the top layer (the last layer) of the half-finished product (i.e., the first portion of the filter 1) in the first phase. That is, on the No. 136 layer of the first portion, high and low refraction index layers with thicknesses of non λ/4 are continued to be alternately stacked thereon until it comes to 165 layers as a whole. The alternately stacked high and low refraction index layers as added in the second phase thus result in the second portion of the filter 1 of the present invention.

Therefore, with reference to FIGS. 1 and 2, the whole multi-layer structure of the filter 1 in an exemplary embodiment in accordance with the present invention can be depicted as below:

The first portion thereof: the No. 1 layer is on the glass substrate 10 and is of high refraction index with a thickness of λ/4; the No. 2 layer is of low refraction index and stacked on the No. 1 high reflective layer with a thickness of λ/4; . . . the No. 6 layer is of low refraction index and stacked on the No. 5 layer thereof with a thickness of 6 multiples of λ/4; . . . the No. 20 layer is of low refraction index and stacked on the No. 19 layer thereof with a thickness of 2 multiples of λ/4; . . . the No. 36 layer is of low refraction index and stacked on the No. 35 layer thereof with a thickness of 6 multiples of λ/4; . . . the No. 52 layer is of low refraction index and stacked on the No. 51 layer thereof with a thickness of 4 multiples of λ/4; . . . the No. 68 layer is of low refraction index and stacked on the No. 67 layer thereof with a thickness of 6 multiples of λ/4; . . . the 84 layer is of low refraction index and stacked on the No. 83 layer thereof with a thickness of 4 multiples of λ/4; . . . the No. 100 layer is of low refraction index and stacked on the No. 99 layer thereof with a thickness of 6 multiples of λ/4; . . . the No. 116 layer is of low refraction index and stacked on the No. 115 layer thereof with a thickness of 2 multiples of λ/4; . . . the No. 130 layer is of low refraction index and stacked on the No. 129 layer thereof with a thickness of 6 multiples of λ/4; . . . the No. 136 layer is of low refraction index and stacked on the No. 135 layer thereof with a thickness of λ/4.

The second portion thereof: the No. 137 layer is of high refraction index and stacked on the No. 136 layer of the first portion thereof with a thickness of 0.6147 multiple of λ/4; the No. 138 layer is of low refraction index and stacked on the No. 137 layer with a thickness of 0.9150 multiple of λ/4; the No. 139 layer is of high refraction index and stacked on the No. 138 layer with a thickness of 0.8560 multiple of λ/4; the No. 140 layer is of low refraction index and stacked on the No. 139 layer with a thickness of 0.8383 multiple of λ/4; the No. 141 layer is of high refraction index and stacked on the No. 140 layer with a thickness of 0.7836 multiple of λ/4; the No. 142 layer is of low refraction index and stacked on the No. 141 layer with a thickness of 0.8146 multiple of λ/4; the No. 143 layer is of high refraction index and stacked on the No. 142 layer with a thickness of 0.7698 multiple of λ/4; the No. 144 layer is of low refraction index and stacked on the No. 143 layer with a thickness of 0.7993 multiple of λ/4; the No. 145 layer is of high refraction index and stacked on No. 144 layer with a thickness of 0.8286 multiple of λ/4; the No. 146 layer is of low refraction index and stacked on the No. 145 layer with a thickness of 0.9172 multiple of λ/4; the No. 147 layer is of high refraction index and stacked on the No. 146 layer with a thickness of 0.8540 multiple of λ/4; the No. 148 layer is of low refraction index and stacked on the No. 147 layer with a thickness of 1.1421 multiple of λ/4; the No. 149 layer is of high refraction index and stacked on the No. 148 layer with a thickness of 0.8356 multiple of λ/4; the No. 150 layer is of low refraction index and stacked on the No. 149 layer with a thickness of 0.8967 multiple of λ/4; the No. 151 layer is of high refraction index and stacked on the No. 150 layer with a thickness of 0.8087 multiple of λ/4; the No. 152 layer is of low refraction index and stacked on the No. 151 layer with a thickness of 0.8479 multiple of λ/4; the No. 153 layer is of high refraction index and stacked on the No. 152 layer with a thickness of 0.8031 multiple of λ/4; the No. 154 layer is of low refraction index and stacked on the No. 153 layer with thickness of 0.8515 multiple of λ/4; the No. 155 layer is of high refraction index and stacked on the No. 154 layer with a thickness of 0.8362 multiple of λ/4; the No. 156 layer is of low refraction index and stacked on the No. 155 layer with a thickness of 0.8571 multiple of λ/4; the No. 157 layer is of high refraction index and stacked on the No. 156 layer with a thickness of 0.8816 multiple of λ/4; the No. 158 layer is of low refraction index and stacked on the No. 157 layer with a thickness of 0.8610 multiple of λ/4; the No. 159 layer is of high refraction index and stacked on the No. 158 layer with a thickness of 0.8008 multiple of λ/4; the No. 160 layer is of low refraction index and stacked on the No. 159 layer with a thickness of 0.9363 multiple of λ/4; the No. 161 layer is of high refraction index and stacked on the No. 160 layer with a thickness of 0.8614 multiple of λ/4; the No. 162 layer is of low refraction index and stacked on the No. 161 layer with a thickness of 0.7339 multiple of λ/4; the No. 163 layer is of high refraction index and stacked on the No. 162 layer with a thickness of 0.8306 multiple of λ/4; the No. 164 layer is of low refraction index and stacked on the No. 163 layer with a thickness of 0.8871 multiple of λ/4; and the No. 165 layer is of high refraction index and stacked on the No. 164 layer with a thickness of 0.5526 multiple of λ/4.

Figure 5:
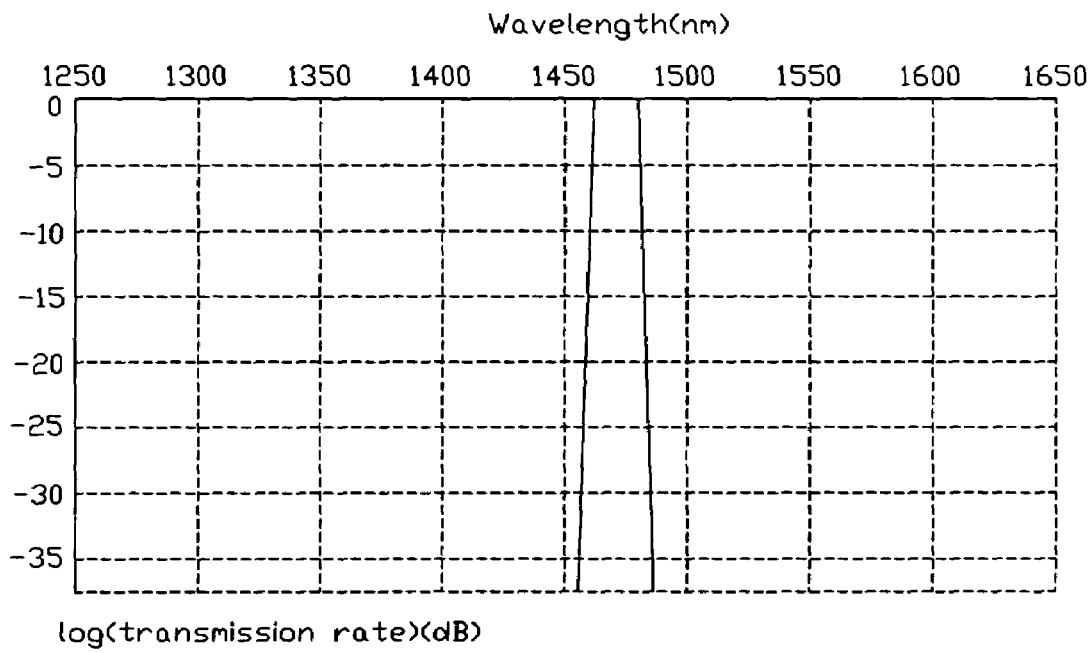
FIG. 5 is the spectrum characteristics graph of the CWDM filter in accordance with the present invention.

The spectrum characteristics of the second portion of the filter 1 in accordance with the present invention please refer to FIG. 5, from which we may see that the afore-mentioned noises have been removed.

It is common that there is an extremum existed when the thickness of a $\lambda/4$ layer is nd=$\lambda/4$. If adopting a penetrating transmission type auto-monitor system with a precision of 0.01% to monitor the thickness thereof, which is to say, that the system will stop monitoring instantly when the thickness reaches its extremum (maximum value or minimum value). The refraction index of the high refraction index layers may be 2.1-2.4, while that of the low refraction index layers may usually be 1.44. The thicknesses of non whole number multiples of $\lambda/4$ layers are randomly set according to the preset wavelength range thereof and take 1470 nm as the center wavelength thereof by computer.

As mentioned above, CWDM filters often adopt $\lambda/4$ thickness layer-stacks of plurality of multi-layer cavities with the same structure. But in the 1260-1640 nm wavelength range, phenomena of light leakage or noises exist in wavelength ranges other than that of the signals of the filter.

However, the CWDM optical filter in accordance with the present invention further has a plurality of non $\lambda/4$ multi-layer stacks (i.e., the thicknesses thereof are not the whole number multiples of $\lambda/4$ with different structures (the second portion) on the basis of the first portion thereof, which is consisted of a few $\lambda/4$ Fabry-Perot cavity structures with the same structure thereof. Thus, the afore-mentioned light leakage or noises phenomena can be avoided thereby achieving wider application within the required wavelength ranges of optical communication field.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of portions within the principles of the invention to the full extent indicated by the broad general meaning of the terms in which the appended claims are expressed.

The invention claimed is:

1. A coarse wavelength division multiplex filter comprising a first portion and a second portion, the first portion including at least two Fabry-Perot cavity structures, the second portion including a non $\lambda/4$ multi-layer structure which has a plurality of alternately superposed high refraction index layers and low refraction index layers on the first portion thereof, wherein the thicknesses of the non $\lambda/4$ layers are randomly produced as per a pre-set wavelength range which takes 1470 nm as the center wavelength thereof by computer, and the at least two Fabry-Perot resonance cavity structures of the first portion obey the following rule: $(LH)^3 6L(HL)^3 H(LH)^3 2L(HL)^3 H(LH)^4 6L(HL)^4 H(LH)^3 4L (HL)^3 H(LH)^4 6L \quad (HL)^4 H(LH)^3 4L(HL)^3 H(LH)^4 6L(HL)^4 H (LH)^3 2L(HL)^3 H(LH)^3 6L(HL)^2 H/N_S$; wherein, $N_S$ represents for the substrate thereof, L represents for low refraction index layer with a thickness of $\lambda/4$, H represents for high refraction index layer with a thickness of $\lambda/4$, and $\lambda_O$ represents for the center wavelength thereof.

2. The coarse wavelength division multiplex filter as claimed in claim 1, wherein the second potion includes 29 layers of high and low refraction index layers which are alternately stacked over each other.

3. The coarse wavelength division multiplex filter as claimed in claim 1, wherein the first portion includes 136 layers totally thereof.

4. The coarse wavelength division multiplex filter as claimed in claim 3, wherein the multi-layer structure of the second portion is: the No. 137 layer is of high refraction index and stacked on the No. 136 layer of the first portion thereof with a thickness of 0.6147 multiple of $\lambda/4$; the No. 138 layer is of low refraction index and stacked on the No. 137 layer with a thickness of 0.9150 multiple of $\lambda/4$; the No. 139 layer is of high refraction index and stacked on the No. 138 layer with a thickness of 0.8560 multiple of $\lambda/4$; the No. 140 layer is of low refraction index and stacked on the No. 139 layer with a thickness of 0.8383 multiple of $\lambda/4$; the No. 141 layer is of high refraction index and stacked on the No. 140 layer with a thickness of 0.7836 multiple of $\lambda/4$; the No. 142 layer is of low refraction index and stacked on the No. 141 layer with a thickness of 0.8146 multiple of $\lambda/4$; the No. 143 layer is of high refraction index and stacked on the No. 142 layer with a thickness of 0.7698 multiple of $\lambda/4$; the No. 144 layer is of low refraction index and stacked on the No. 143 layer with a thickness of 0.7993 multiple of $\lambda/4$; the No. 145 layer is of high refraction index and stacked on No. 144 layer with a thickness of 0.8286 multiple of $\lambda/4$; the No. 146 layer is of low refraction index and stacked on the No. 145 layer with a thickness of 0.9172 multiple of $\lambda/4$; the No. 147 layer is of high refraction index and stacked on the No. 146 layer with a thickness of 0.8540 multiple of $\lambda/4$; the No. 148 layer is of low refraction index and stacked on the No. 147 layer with a thickness of 1.1421 multiple of $\lambda/4$; the No. 149 layer is of high refraction index and stacked on the No. 148 layer with a thickness of 0.8356 multiple of $\lambda/4$; the No. 150 layer is of low refraction index and stacked on the No. 149 layer with a thickness of 0.8967 multiple of $\lambda/4$; the No. 151 layer is of high refraction index and stacked on the No. 150 layer with a thickness of 0.8087 multiple of $\lambda/4$; the No. 152 layer is of low refraction index and stacked on the No. 151 layer with a thickness of 0.8479 multiple of $\lambda/4$; the No. 153 layer is of high refraction index and stacked on the No. 152 layer with a thickness of 0.8031 multiple of $\lambda/4$; the No. 154 layer is of low refraction index and stacked on the No. 153 layer with thickness of 0.8515 multiple of $\lambda/4$; the No. 155 layer is of high refraction index and stacked on the No. 154 layer with a thickness of 0.8362 multiple of $\lambda/4$; the No. 156 layer is of low refraction index and stacked on the No. 155 layer with a thickness of 0.8571 multiple of $\lambda/4$; the No. 157 layer is of high refraction index and stacked on the No. 156 layer with a thickness of 0.8816 multiple of $\lambda/4$; the No. 158 layer is of low refraction index and stacked on the No. 157 layer with a thickness of 0.8610 multiple of $\lambda/4$; the No. 159 layer is of high refraction index and stacked on the No. 158 layer with a thickness of 0.8008 multiple of $\lambda/4$ the No 160 layer is of low refraction index and stacked on the No. 159 layer with a thickness of 0.9363 multiple of $\lambda/4$; the No. 161 layer is of high refraction index and stacked on the No. 160 layer with a thickness of 0.8614 multiple of $\lambda/4$; the No. 162 layer is of low refraction index and stacked on the No. 161 layer with a thickness of 0.7339 multiple of $\lambda/4$; the No. 163 layer is of high refraction index and stacked on the No. 162 layer with a thickness of 0.8306 multiple of $\lambda/4$; the No. 164 layer is of low refraction index and stacked on the No. 163 layer with a thickness of 0.8871 multiple of $\lambda/4$; and the No. 165 layer is of high refraction index and stacked on the No. 164 layer with a thickness of 0.5526 multiple of $\lambda/4$.

5. The coarse wavelength division multiplex filter as claimed in claim 1, wherein said center wavelength $\lambda_O$ is 1470 nm.

6. The coarse wavelength division multiplex filter as claimed in claim 1, wherein said center wavelength $\lambda_O$ is 1490 nm.

7. The coarse wavelength division multiplex filter as claimed in claim 1, wherein the maximal transmittance index thereof is higher than 90%.

8. The coarse wavelength division multiplex filter as claimed in claim 1, wherein the cut-off wavelengths thereof are: short wavelength 1230-1457 nm, long wavelength 1483-1830 nm.

9. The coarse wavelength division multiplex filter as claimed in claim 1, wherein the surface polishing diameter of the substrate of the first portion is 90 mm with a thickness of 10 mm, and contains thereof such elements as SiO2, Barium, Lithium and Natrium.

10. The coarse wavelength division multiplex filter as claimed in claim 1, wherein two adjacent Fabry-Perot cavity structures of the first portion are connected to each other via a coupling layer.

11. The coarse wavelength division multiplex filter as claimed in claim 10, wherein each Fabry-Perot cavity structure is composed of two multi-layer stacks of odd or even layers.

12. The coarse wavelength division multiplex filter as claimed in claim 11, wherein the spacer layer of each Fabry-Perot cavity structure is of low refraction index and has a thickness of even multiples of $\lambda/4$ thereof.

* * * * *